(12) United States Patent
González et al.

(10) Patent No.: US 7,188,877 B2
(45) Date of Patent: Mar. 13, 2007

(54) CRASH BOX

(75) Inventors: Diego César González, Paderborn (DE); Dariusz Straznikiewicz, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/381,448

(22) Filed: May 3, 2006

(65) Prior Publication Data

US 2006/0249962 A1     Nov. 9, 2006

(51) Int. Cl.
B60R 19/24 (2006.01)
B60R 19/34 (2006.01)
(52) U.S. Cl. .................. 293/133; 293/155; 403/408.1; 411/546
(58) Field of Classification Search ................ 293/132, 293/133, 154, 155; 403/43, 48, 150, 154, 403/388, 408.1; 411/119, 120, 338, 389, 411/546
See application file for complete search history.

(56) References Cited

U.S. PATENT DOCUMENTS

| | | | |
|---|---|---|---|
| 3,633,934 A | 1/1972 | Wilfert | |
| 3,754,677 A * | 8/1973 | Hug | 220/288 |
| 6,406,077 B2 * | 6/2002 | Johnson | 293/102 |
| 6,431,602 B1 * | 8/2002 | Ralko et al. | 280/781 |
| 6,702,503 B2 * | 3/2004 | Pinzl | 403/200 |
| 6,776,566 B2 * | 8/2004 | Kobusch et al. | 411/546 |
| 7,086,801 B2 * | 8/2006 | Swahn et al. | 403/118 |
| 2002/0150445 A1 * | 10/2002 | Ozawa et al. | 411/546 |
| 2005/0025566 A1 * | 2/2005 | Hasegawa | 403/408.1 |

FOREIGN PATENT DOCUMENTS

| | | | |
|---|---|---|---|
| DE | 42 05 032 A1 | 8/1993 | |
| DE | 42 38 631 A1 | 5/1994 | |
| DE | 298 08 143 U | 9/1998 | |
| EP | 556667 A1 * | 8/1993 | 293/132 |
| WO | WO 99/15364 | 4/1999 | |

\* cited by examiner

Primary Examiner—Dennis H. Pedder
Assistant Examiner—Paul Chenevert
(74) Attorney, Agent, or Firm—Henry M. Feiereisen

(57) ABSTRACT

A crash box for a motor vehicle includes an attachment portion which engages a longitudinal member of the motor vehicle and is secured thereto by at least one screw bolt which extends through a spacer sleeve. The spacer sleeve is securely fixed to the attachment portion and has two threaded portions of opposite pitch. Inserted from opposite sides of the spacer sleeve are tolerance compensating bolts, which are each provided with an inner rotary catch for interaction with an outer thread of the screw bolt. When the screw bolt is screwed in, the tolerance compensating bolts are thus moved apart until abutting against opposite inside wall surfaces of the longitudinal member. The screw bolt engages hereby a nut on an outside of the longitudinal member so that the attachment portion is now held without clearance on the longitudinal member by a head portion of the screw bolt and one of the tolerance compensating bolts, and by the other one of the tolerance compensating bolts and the nut.

16 Claims, 4 Drawing Sheets

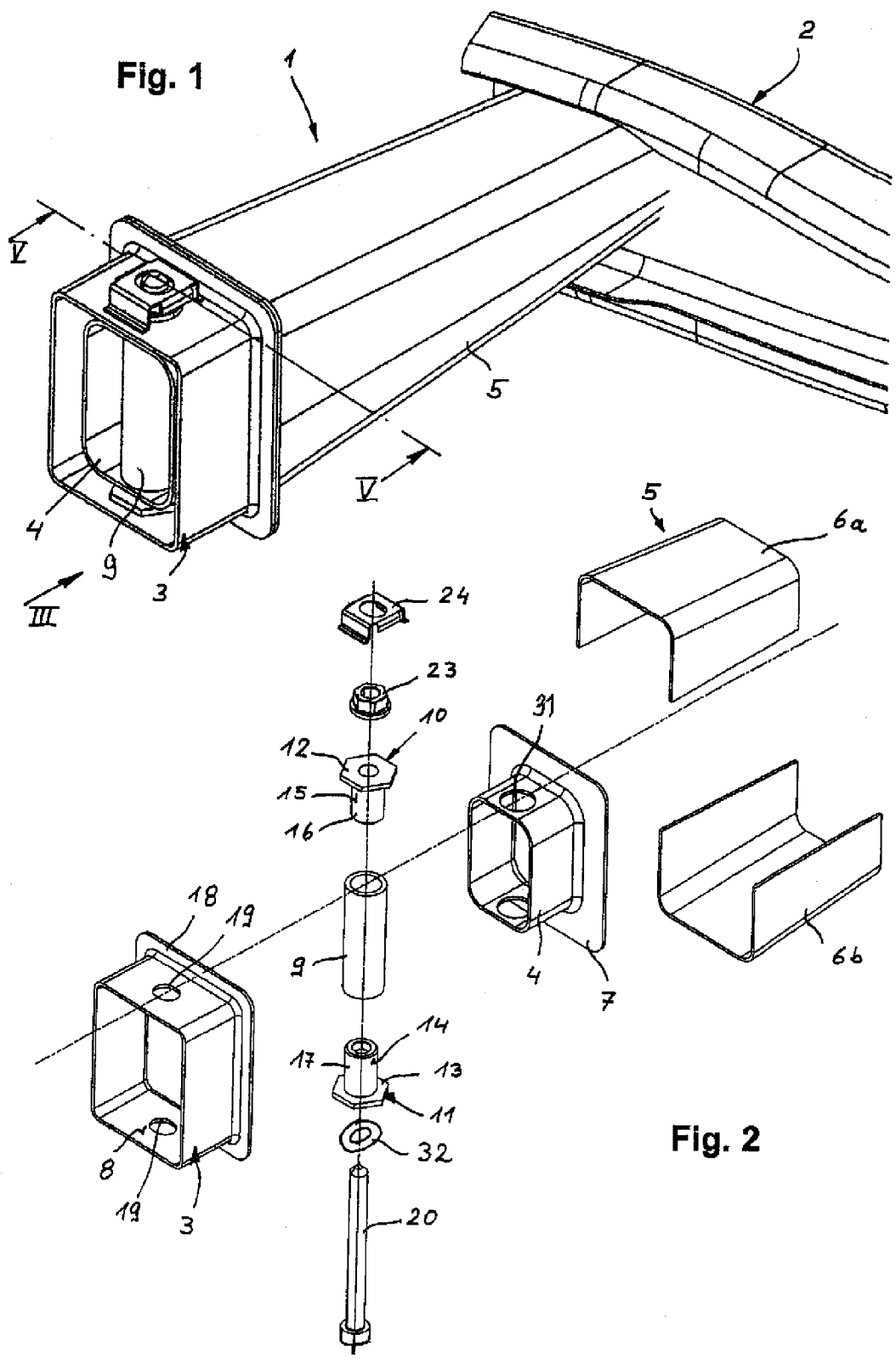

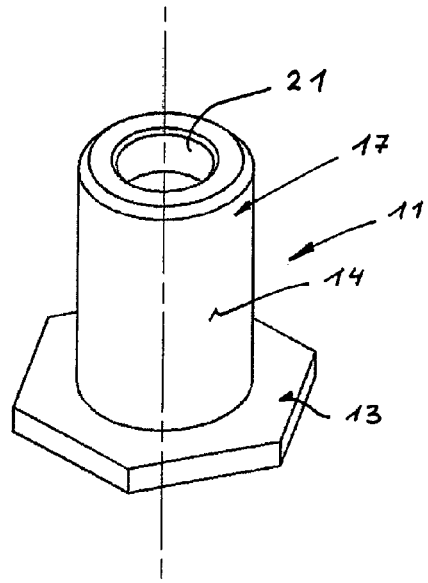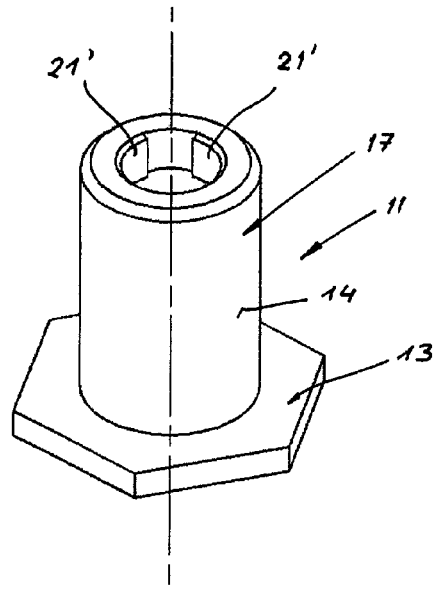
Fig. 4b　　　　　　　　　Fig. 4c
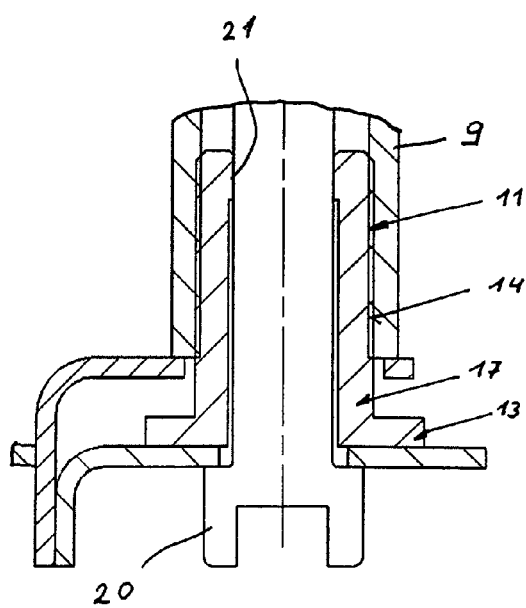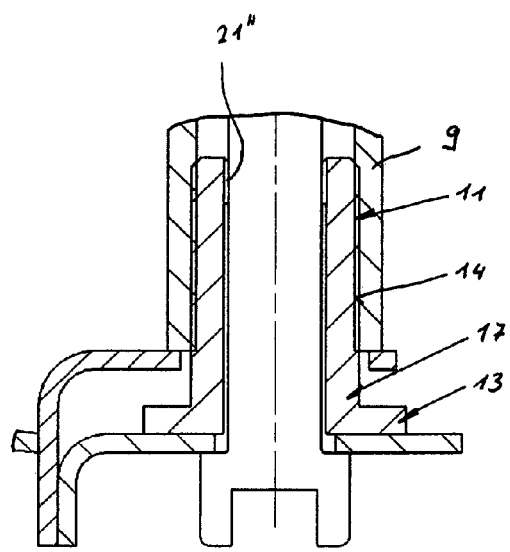
Fig. 4a　　　　　　　　　Fig. 4d

CRASH BOX

CROSS-REFERENCES TO RELATED APPLICATIONS

This application claims the priority of German Patent Application, Ser. No. 10 2005 021 661.7, filed May 6, 2005, pursuant to 35 U.S.C. 119(a)–(d), the content of which is incorporated herein by reference.

BACKGROUND OF THE INVENTION

The present invention relates, in general, to a crash box for a motor vehicle.

Nothing in the following discussion of the state of the art is to be construed as an admission of prior art.

Crash boxes are thin-walled, typically rectangular elements of steel, aluminum, or plastic, and disposed between a bumper cross member and a longitudinal member of a motor vehicle, for preventing damage to the vehicle body in the event of frontal or rear-end collisions at low speed. Crash boxes can be manufactured by joining compressed sheet-metal shells, or in single-piece construction using an extruded aluminum section for example. In the event of an impact, the crash box converts the generated kinetic energy into deformation work to prevent permanent damage to the longitudinal member when a critical stress level has been exceeded.

Crash boxes may be secured to the longitudinal members by means of flanged plates mounted to the end surface of the longitudinal members. This approach is disadvantageous because of the need for additional components, i.e. flanged plates, so that the overall weight of the motor vehicle is increased. The installation space between the longitudinal members is however critical for the installation of the drive unit. Flanged plates reduce the necessary installation space and complicate the installation. In addition, the use of flanged plates requires also room for tools which oftentimes is not available to allow installation of an optimum construction.

Another approach is disclosed in German utility model no. DE 298 08 143 U1, which describes a securement of crash boxes on the side to the longitudinal members by means of transverse bolts extending through the longitudinal members. Like the afore-described support of the crash boxes on the end surface of the longitudinal members, this construction too requires increased installation space.

Insertion of crash boxes into the longitudinal members has also been proposed in order to attempt a better utilization of the available installation space within the longitudinal members. Examples include International Publication Number WO 99/15364 or U.S. Pat. No. 3,633,934 which disclose telescoping dampers that slide into the longitudinal members in the event of a collision. German Offenlegungsschrift DE 42 38 631 A1 describes a damper having inner and outer tubes which move within one another, with the outer tube being supported on the longitudinal member by a flange.

It would be desirable and advantageous to provide an improved crash box which obviates prior art shortcomings and which requires little space and is easy to secure to the longitudinal beam while having a lightweight structure and allowing a tolerance compensation between the crash box and the longitudinal member.

SUMMARY OF THE INVENTION

According to one aspect of the present invention, a crash box for incorporation between a bumper cross member and a longitudinal member of a motor vehicle, includes an attachment portion for engagement into the longitudinal member of the motor vehicle, a screw bolt for connecting the attachment portion to the longitudinal member, a spacer sleeve non-rotatably connected with the attachment portion and having two threaded portions of opposite pitch, and tolerance compensating bolts for threaded engagement in the spacer sleeve, each of the tolerance compensating bolts provided with an inside rotary catch which engages an outer thread of the screw bolt, when the screw bolt extends through the tolerance compensating bolts and the spacer sleeve, wherein the tolerance compensating bolts, when installed, are brought into abutment against an inside wall surface of the longitudinal member as the screw bolt turns and engages a nut on an outside of the longitudinal member so that the attachment portion is held without clearance on the longitudinal member by a head portion of the screw bolts and one of the tolerance compensating bolts, and by the other one of the tolerance compensating bolts and the nut.

An essential feature of the present invention is the non-rotatable securement of the attachment portion with the spacer sleeve having threads of opposite pitch for threaded engagement of tolerance compensating bolts, and the presence of the rotary catches that are in engagement with the outer thread of the screw bolt. Thus, as the screw bolt is turned, the tolerance compensating bolts move apart toward the respectively confronting inner sides of the longitudinal member until abutting thereagainst.

According to another feature of the present invention, the rotary catch may be realized by providing protrusions in the form of lugs or lobes on the inside circumference of the tolerance compensating bolt which lock onto the screw bolt. A screw bolt with right-hand thread would come into contact with the rotary catch when the first one of the tolerance compensating bolts, which has a thread opposite to the screw bolt, i.e. left-hand thread, is inserted. As the screw bolt is turned clockwise, this tolerance compensating bolt gets unscrewed from the left-hand thread of the spacer sleeve and thereby moves into abutment against the inner side of the longitudinal member. As rotation of the screw bolt is continued and the non-rotatable connection between the respective rotary catch and the screw bolt becomes no longer effective because the rotary catch breaks or disintegrates, the screw bolt moves further into the spacer sleeve until the head-distal end of the screw bolt comes into contact with the second one of the tolerance compensating bolts and its rotary catch. As a consequence of the opposite thread, i.e. right-hand thread, of the second tolerance compensating bolt in relation to the first tolerance compensating bolt, the second tolerance compensating bolt gets unscrewed from the spacer sleeve and comes into contact with the opposite inner side of the longitudinal member. Continued rotation of the screw bolt also destroys the rotary catch of the second tolerance compensating bolt to such an extent that further rotation of the tolerance compensating bolts is no longer possible. In this way, opposite sides of the longitudinal member mutually support one another and existing assembly tolerances are compensated.

The screw bolt ultimately extends through the longitudinal member and engages a nut on the outside of the longitudinal member. As the screw bolt is further tightened, the spacer sleeve together with the tolerance compensating bolts define a support body which is able to resist screw forces encountered between the screw bolt head and the nut. The walls of the longitudinal member are braced between the respective tolerance compensating bolts and the screw bolt head and nut, when assembled.

According to another feature of the present invention, the rotary catch may be formed as a plastic ring, e.g. of polyamide, for blocking the thread turns of the screw bolt in relation to the tolerance compensating bolts at least along a partial portion of the circumference. The anti-rotation mechanism may be implemented by different types of inserts or geometric variations, such as, e.g., shearing pins which release the clamping action between the tolerance compensating bolts and the screw bolt, when a maximum load has been exceeded, so that the screw bolt can be turned further in relation to the immobile tolerance compensating bolt. A further benefit is also that the plastic rotary catch may subsequently secure the screw bolt place so as to prevent inadvertent loosening of the screw bolt.

A crash box according to the present invention is easy to assemble, without requiring the presence of wide stop plates which need room for a tool. By eliminating the need for wide stop plates, the overall weight of the crash box is also reduced. Installation of the crash box is not accompanied by a deformation of crash box components or components of the longitudinal member. Tolerance compensation is realized exclusively by special screw elements and respective oblong holes in the longitudinal members for passage of the screw bolts. The number of screw elements is also reduced. Another benefit relates to the absence of any installation aids for assembly in X-direction, i.e. in longitudinal direction of the vehicle. The X-direction is defined by the insertion depth of the attachment portion which insertion depth in turn is limited by a stop plate bearing upon an end flange of the longitudinal member. It is important to note in this context that the end flange and the stop plate fulfill only the function as stop and do not assist in any way in the actual threaded securement of the crash box to the longitudinal member. As a result, the dimensions of the end flange and the stop plate can be sized very small, which means that the available installation space in the engine compartment is increased. This is advantageous as far as vehicle design is concerned. In general, a screw connection is possible in Y and Z directions, i.e. in a direction transversely to the travel direction and in vertical direction.

According to another feature of the present invention, the attachment portion and the stop plate may form a single-piece structure. Suitably, the attachment portion may be formed by stamping the stop plate, using a debossing process for example. The attachment portion is significantly smaller in width than the clear width of the longitudinal member for engagement by the attachment portion. The thus created circumferential gap between the attachment portion and the walls of the longitudinal member enables a positioning of the bumper and the attached crash box, without encountering any rubbing between the components during assembly and without experiencing any jamming action. Tolerances of the longitudinal member can be compensated by this gap which may range about 3 mm.

According to another feature of the present invention, the attachment portion may be a tubular pipe connected through material union with the stop plate.

According to another feature of the present invention, the attachment portion may have receiving bores for accommodating the spacer sleeve.

According to another feature of the present invention, the nut may be a cage nut.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective illustration of one embodiment of a crash box according to the present invention;

FIG. 2 is an exploded illustration of the crash box;

FIG. 4a is an enlarged detailed cutaway view of FIG. 4, showing a tolerance compensating bolt with inner rotary catch;

FIG. 4b is a perspective view of the tolerance compensating bolt of FIG. 4a;

FIG. 4c is a perspective view of a variation of a tolerance compensating bolt with inner rotary catch;

FIG. 4d is an enlarged detailed cutaway view of another variation of a tolerance compensating bolt with inner rotary catch;

DETAILED DESCRIPTION OF PREFERRED EMBODIMENTS

Figure 3:
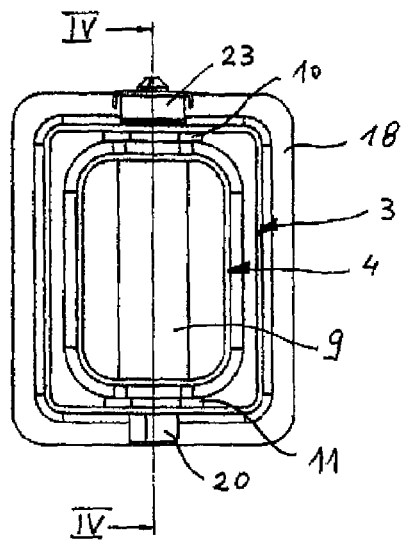
FIG. 3 is an end view of the crash box and part of a bumper cross member taken in the direction of arrow III in FIG. 1.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a crash box according to the present invention, generally designated by reference numeral 1 and intended for connection to a bumper cross member 2 and a longitudinal member 3 of an unillustrated motor vehicle. The crash box 1 includes two parts, namely an attachment portion 4 for engagement into the longitudinal member 3, and a deformation portion 5 which is disposed anteriorly of the end surface of the longitudinal member 3.

Figure 5:
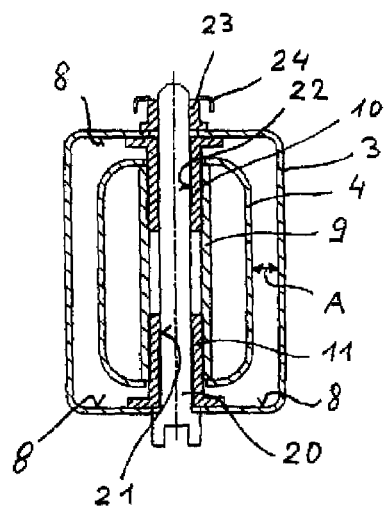
FIG. 5 is a sectional view of the crash box, taken along the line V—V in FIG. 1.

As shown in particular in FIG. 2, which is an exploded illustration of the crash box 1, the deformation portion 5 is comprised of an upper half-shell 6a and a lower half-shell 6b which are welded together when made of metal. The attachment portion 4 is made from a stop plate 7 through stamping or debossing, to thereby form a single-piece structure. The vehicle longitudinal member 3 has a substantially rectangular cross section with rounded corners and defines an inside diameter which is greater than the outside diameter of the attachment portion 4 which is also constructed of substantial rectangular cross section and has rounded corners, whereby the corners of the attachment portion 4 are more rounded than the corners of the longitudinal member 3. As a result, a circumferential gap A of, for example 3 mm, is defined between the attachment portion 4 and an opposite inside wall 8 of the longitudinal member 3, whereby the gap A is substantially constant, except for the area of the rounded corners of the longitudinal member 3 and the attachment portion 4. This is shown in particular in FIGS. 3 and 5.

The crash box 1 further includes a spacer sleeve 9 which has two thread portions of opposite pitch and is received centrally in the attachment portion 4 between two receiving bores 31 of the attachment portion 4. The spacer sleeve 9 is welded from the inside to the attachment portion 4 to prevent the spacer sleeve 9 from rotating. Inserted from each end into the spacer sleeve 9 are two tolerance compensating bolts 10, 11, having each a flat hexagonal head 12, 13 and a threaded shank 16, 17 formed with an outer thread 14, 15. As shown in particular in FIGS. 4 and 5, the hexagonal head 12, 13 has a greater diameter than the threaded shank 16, 17 of the tolerance compensating bolts 10, 11.

In preassembled state of the crash box 1, the tolerance compensating bolts 10, 11 are threaded with their shank 16, 17 into the spacer sleeve 9 as much as possible. The securement of the pre-fabricated crash box 1 to the longitudinal member 3 is as follows: The crash box 1 is inserted into the longitudinal member 3 until the stop plate 7 abuts against an end flange 18 of the longitudinal member 3. This defines a maximum penetration depth of the crash box 1 in X direction, i.e. in length direction of the motor vehicle and length direction of the longitudinal member 3, whereby receiving bores 19 of the longitudinal member 3 are in alignment with the receiving bores 31 of the attachment portion 4. A screw bolt 20 with outer thread is then inserted through the aligned receiving bores 19, 31 into the spacer sleeve 9, whereby in a first stage, the screw bolt 20 engages the tolerance compensating bolt 11 and interacts with a rotary catch 21 (FIG. 5) on an inside surface of the tolerance compensating bolt 11. As the screw bolt 20 is turned further in a second stage, it engages a rotary catch 22 (FIG. 5) of the other tolerance compensating bolt 10. Rotation of the screw bolt 20 causes a movement of the tolerance compensating bolts 10, 11 in opposite directions until the heads 12, 13 of the tolerance compensating bolts 10, 11 abut against the inner side walls 8 of the longitudinal member 3. For example, the outer thread 14 of the tolerance compensating bolt 11 may hereby be a left-hand thread, and the outer thread 15 of the tolerance compensating bolt 10 may be a right-hand thread.

Figure 4:
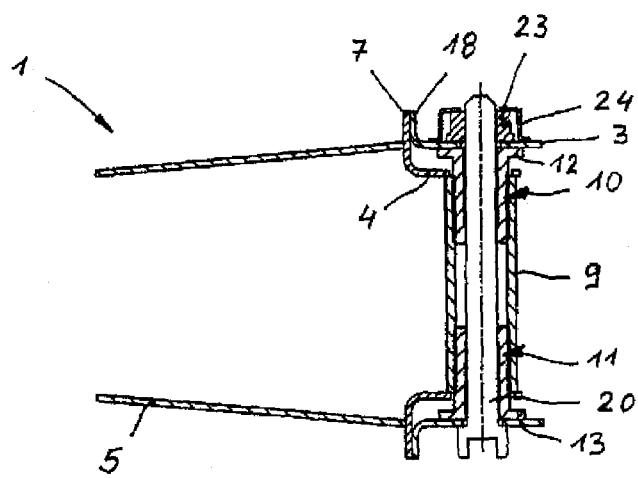
FIG. 4 is a sectional view of the crash box, taken along the line IV—IV in FIG. 3.

As shown in FIG. 4a, which is an enlarged detailed cutaway view of FIG. 4 to show the tolerance compensating bolt 11 in greater detail, and in FIG. 4b, which is a perspective view of the tolerance compensating bolt 11, the rotary catch 21 of the tolerance compensating bolt 11 is formed by a protrusion on the inside circumference of the tolerance compensating bolt 11 to lock onto the screw bolt 20. FIG. 4c shows a variation of the rotary catch, designated by reference numeral 21', to show the rotary catch 21 extending about a partial portion of the inner circumference of the tolerance compensating bolt 11. FIG. 4d shows a variation of the tolerance compensating bolt 11, which is provided with an inner rotary catch 21" in the form of a plastic ring, e.g. of polyamide, which bears upon the inside surface of the tolerance compensating bolt 11.

The receiving bores 19 are designed as oblong holes in Y direction. In other words, the receiving bores 19 are oval-shaped. The screw bolt 20 extends fully through the longitudinal member 3 to engage a nut 23 which is securely fixed to the outside of the longitudinal member 3 and held in a sheet-metal cage 24. The screw bolt 20 is thus tightened via an interposed washer 32 by the nut 23, whereby the tolerance compensating bolts 10, 11 together with the spacer sleeve 9 serve as abutment, without deformation of the attachment portion 4 of the crash box 1 or deformation of the longitudinal member 3. The attachment portion 4 is thus held without clearance on the longitudinal member 3 by a head portion of the screw bolt 20 and the tolerance compensating bolt 11, on the one hand, and by the tolerance compensating bolt 10 and the nut 23, on the other hand, as shown in particular in FIG. 3.

Figure 6:
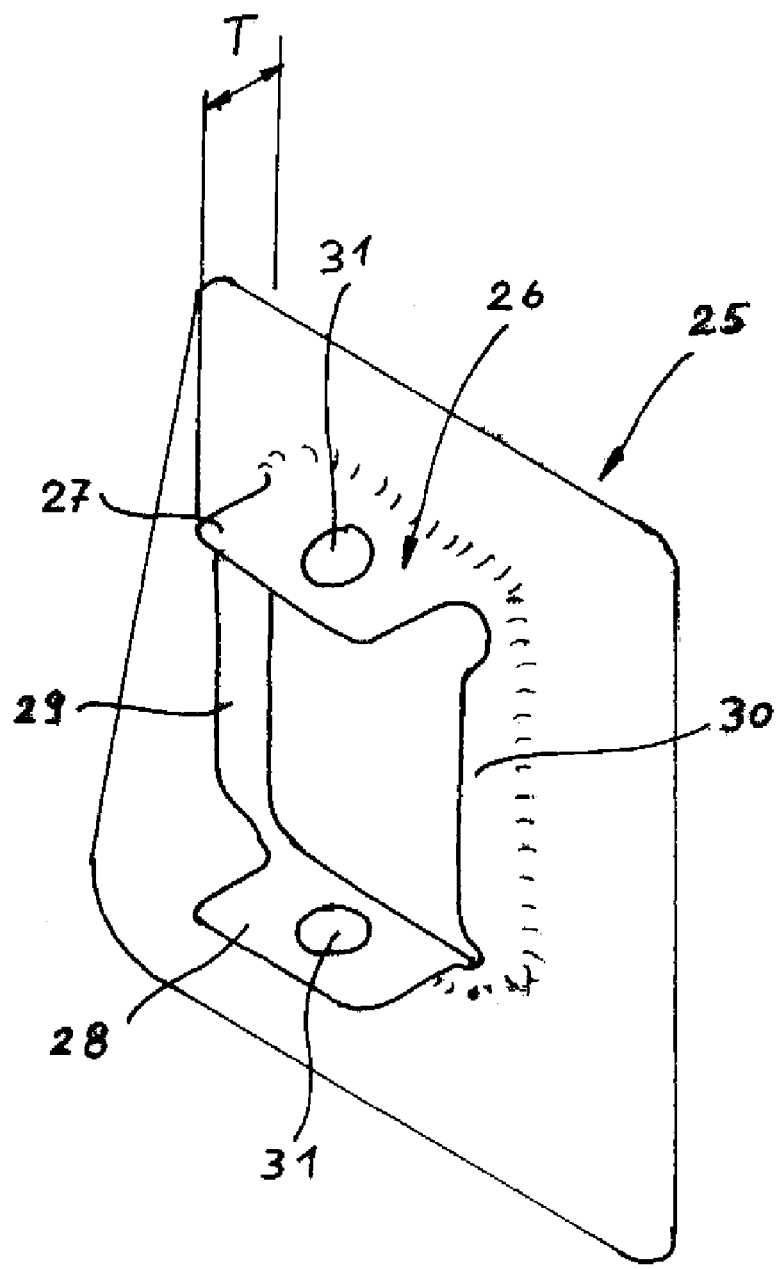
FIG. 6 is a perspective illustration of a modified stop plate.

Turning now to FIG. 6, there is shown a perspective illustration of a modified stop plate, generally designated by reference numeral 25. The stop plate 25 differs from the stop plate 7 by having an attachment portion 26 which is not of same depth T about its entire circumference but has confronting pairs of wall portions 27, 28; 29, 30 of different depth T. It is generally sufficient, to provide only the wall portions 28, 28 of greater depth T for accommodating receiving bores 31. The provision of different depths T may be appropriate for manufacturing reasons, like, e.g. during pressing, but also for weight saving reasons.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A crash box for a motor vehicle, comprising:
   an attachment portion for engagement into a longitudinal member of the motor vehicle;
   a screw bolt for connecting the attachment portion to the longitudinal member;
   a spacer sleeve securely fixed to the attachment portion and having two threaded portions of opposite pitch;
   tolerance compensating bolts for threaded engagement into opposite ends of the spacer sleeve, each of the tolerance compensating bolts provided with an inner rotary catch for interaction with the screw bolt such that the tolerance compensating bolts move away from one another, as the screw bolt is screwed in, until the tolerance compensating bolts abut against an inside wall surface of the longitudinal member so as to hold the attachment portion without clearance in relation to the longitudinal member.

2. The crash box of claim 1, wherein the rotary catch of each tolerance compensating bolt is constructed to disengage from the screw bolt, when the tolerance compensating bolt abuts against the inside wall surface of the longitudinal member and a maximum load is exceeded so that the tolerance compensating bolt can no longer rotate.

3. A method of securing a crash box to a longitudinal member of a motor vehicle, comprising the steps of:
   connecting a spacer sleeve, having two threaded portions of opposite pitch, to an attachment portion of a crash box;
   screwing a first tolerance compensating bolt into one end of the spacer sleeve;

screwing a second tolerance compensating bolt into another end of the spacer sleeve;

placing the attachment portion into a longitudinal member; and threading a screw bolt into the spacer sleeve to move the first and second tolerance compensating bolts in opposite directions against an inside wall surface of the longitudinal member so as to hold the attachment portion without clearance in relation to the longitudinal member.

4. The method of claim 3, wherein the tolerance compensating bolts are moved successively by the screw bolt.

5. A crash box for incorporation between a bumper cross member and a longitudinal member of a motor vehicle, said crash box comprising:

an attachment portion for engagement into the longitudinal member of the motor vehicle;

a screw bolt for connecting the attachment portion to the longitudinal member;

a spacer sleeve non-rotatably connected with the attachment portion and having two threaded portions of opposite pitch; and tolerance compensating bolts for threaded engagement in the spacer sleeve, each of the tolerance compensating bolts provided with an inner rotary catch which engages an outer thread of the screw bolt, when the screw bolt extends through the tolerance compensating bolts and the spacer sleeve, wherein the tolerance compensating bolts, when assembled, are brought into abutment against an inside wall surface of the longitudinal member as the screw bolt turns and engages a nut on an outside of the longitudinal member so that the attachment portion is held without clearance on the longitudinal member by a head portion of the screw bolt and one of the tolerance compensating bolts, and by the other one of the tolerance compensating bolts and the nut.

6. The crash box of claim 5, wherein the rotary catch is formed by a protrusion extending from an inside circumference of the tolerance compensating bolt and intended to lock onto the screw bolt.

7. The crash box of claim 5, wherein the attachment portion has receiving bores for accommodating the spacer sleeve.

8. The crash box of claim 5, wherein the nut is a cage nut.

9. The crash box of claim 5, wherein the attachment portion has pairs of opposite walls, wherein the walls of one pair have a depth which is smaller than a depth of the walls of another pair.

10. The crash box of claim 5, wherein the rotary catch is a plastic ring.

11. The crash box of claim 10, wherein the plastic ring is made of polyamide.

12. The crash box of claim 5, wherein the attachment portion has a width which is smaller than an inside width of the longitudinal member to thereby define a gap between the attachment portion and a confronting wall surface of the longitudinal member.

13. The crash box of claim 12, wherein the gap is about 3 mm in size.

14. The crash box of claim 5, wherein the attachment portion is part of a single-piece stop plate which rests upon an end flange of the longitudinal member, when assembled.

15. The crash box of claim 5, wherein the attachment portion is formed from the stop plate through debossing.

16. The crash box of claim 14, wherein the attachment portion is a tubular pipe connected through material union with the stop plate.

* * * * *